United States Patent Office 2,942,050
Patented June 21, 1960

2,942,050

ELECTRO-CHEMICAL SOURCES OF CURRENT OF LONG SHELF LIFE AND MAKING THE SAME

Peter Denes, Budapest, Hungary, assignor to "Licencia" Találmányokat Értékesitó Vállalat, Budapest, Hungary No Drawing. Filed Sept. 13, 1955, Ser. No. 558,491

Claims priority, application Hungary Sept. 16, 1954

12 Claims. (Cl. 136—3)

Electro-chemical current sources such as primary cells and storage batteries have a loss of capacity on storing because of self-discharge and dissolution of the electrodes, respectively, or by decomposition of their depolarizers and in time become completely destroyed. The storage stability or shelf life capacity being one of the main problems of such current sources, there have been many suggestions to increase their service life. To apply an electrolyte which, in unloaded condition, does not entail any alterations as regards elements such as electrodes, solid depolarizers or depolarizing mixes of the current sources would be the most simple expedient. This suggestion, however, is not quite feasible since the basic working principle of cells or storage batteries requires a reaction between the electrodes and the electrolyte in operation which cannot be obviated even in completely unloaded conditions thereof.

It has been suggested to include inhibitors in the electrolyte which were adapted to reduce the rate of solubility. However, the service life of the current sources can not be reliably lengthened by more than one year if such current sources have been stored at room temperature.

A more considerable increase of the period of their life could be obtained if the current sources were stored at temperatures lying by some centigrades above the freezing point since the rate of solubility of the electrodes in the electrolyte was materially dependent on the temperature of the latter. Thus it was rendered possible to preserve prefabricated cells or piles in specially conditioned store rooms even through a longer period of time. Such a possibility could, however, be made use of in special cases only whereas it was quite unfeasible in shops, small magazines or with private persons. Actually it was only adapted to relieve the manufacturers of batteries from being obliged to organize their work between summer and winter times unevenly or to enable some big consumers to pile up large stocks of such batteries. However, batteries adapted for being stored at such low temperatures only, were soon destroyed at normal temperatures or at summer temperatures of 35 to 40 degrees centigrade.

Furthermore, it has been suggested to coat the electrodes of current sources with a thin protective layer of synthetic resins which was adapted to protect the electrodes during storage and to be removed upon first putting the current sources into circuit. Although such current sources were suitable for a longer period of shelf life previous to using them, after having once been used they were left without further protection. Oxidizing the electrodes or coating them with an inorganic protective layer was likewise of restricted significance since such treated surfaces lasted only until the current sources were used. Actually, such lacquer or inorganic protective layers lose their protective capacity not long after a certain period of shelf life time because of the slowly acting electrolyte. It was, however, a generally observed fact that electro-chemical current sources once put into service became exhausted at an increased speed if again subjected to storing.

In contradistinction, the electro-chemical current sources according to the present invention have, on the one hand, an increased storage capacity or shelf life of a relatively higher order of magnitude and, on the other hand, this increased storage capacity or shelf life is not impaired even by intermediate use. This advantage was not heretofore attained.

The invention is based on the concept, that the rate of solubility and decomposition of elements of electro-chemical current sources such as cells or storage batteries in the electrolyte is reduced when certain organic compounds, particularly silicon-containing organic compounds such as silicones, are applied to the surfaces of the aforesaid elements. The electro-chemical behaviour of the so-treated elements is not impaired, i.e. the potential difference and the short-circuit current between pairs of electrodes coated in the above described manner remains approximately unchanged.

A further significant feature of the current sources according to the invention consists in that coatings of silicon-containing organic compounds are not completely removed from the surface of the electrodes during use such as dissolution thereof but go over for instance to the inactive portions which become free in the course of dissolution. It is not necessary that all molecules of the protective layer participate in forming the new compounds such as metal-silicones. It is enough if such interaction takes place only sporadically. According to practical observations, however, the rate of solubility of the electrode metal is not considerably altered even while it is being consumed. The coatings made of silicon-containing organic compounds are particularly adapted to delay the rate of solubility of negative electrodes made of pure metal or containing mainly lithium, potassium, magnesium, calcium, barium, strontium, aluminum, lanthanum, zinc, cadmium, chromium, titanium, zirconium, iron, manganese or the like.

The aforesaid coatings made of silicon-containing organic compounds are suitable to increase the storage capacity or shelf life of electro-chemical current sources of all types and even during their intermittent use. The effect of using any inhibitors or electrolytes of the slow rate of solubility type appears jointly with the effect of coatings made of silicon-containing organic compounds if applied. The reducing effect of the silicon-containing organic compounds being adjustable by means of suitably selecting the type of such compounds, the thickness of the coating and the conditions of burning in, it is even possible to apply electrolytes which are more aggressive than the conventional ones without impairing the storage capacity or the shelf life of the current sources according to the invention. Such embodiments have on account of the lesser resistance of the relatively more aggressive electrolyte, the advantage of an increased terminal voltage when used or, by virtue of the cold resistancy of the former, an extended lower temperature limit of working.

By applying a coating of silicon-containing organic compounds to the depolarizing mix its stability increases and its self-discharge creating power decreases. Moreover, on account of the extraordinary water-repellent capacity of the silicon-containing organic compounds, fine gas-permeable passages are formed through the electrolyte to the depolarizing mix. Although other water-repellent substances, e.g. certain oils used for surface impregnating purposes, show a like effect and increase the efficiency of the depolarization, the use of silicon-containing organic compounds for coating purposes, yields a more favorable result in this respect since such compounds are of the most water-repellent nature. It is particularly advantageous if the silicon-containing organic compound is applied into the depolarizing mix in powder form thereof in such a manner that the individual grains of the mix are surrounded by an almost monomolecular coating. By mixing with carbon a good conductivity of the mix is obtained since the electrolyte is in intimate contact with the uncoated carbon particles whereas the surface of the depolarizing mix portions is open to the gas-permeable passages.

In order that the depolarizer may be only partly wet by the electrolyte so as to increase the depolarization speed, the coating of the positive electrode with a silicon-containing organic compound may be controlled so that only a portion of the depolarizing powder, or only the graphite powder or only a portion thereof is coated with such compounds. It is possible to coat any combination of the depolarizing powder and the conducting particles with a silicon-containing organic compound.

As has been said, coatings made of silicon-containing organic compounds may successfully be used with all sorts of electro-chemical current sources. The aforesaid effects are manifested by the various silicon-containing organic compounds to different extents. There is no doubt that, according to the nature of the electrodes, the electrolyte and the depolarizer, coatings made of silicon-containing organic compounds of various sorts, thickness and structure will be the most efficient for various purposes.

The rate of solubility reducing action of the silicon-containing organic compounds is dependent, among others, on the temperature and time period of their burning in, on the ratio of the organic components to silicon, and on the nature and manner of chemical structure of the organic radicals.

In order to enable the invention to be more readily understood it will hereinafter be described by means of examples adapted to show some of a number of possible embodiments without, however, restricting the scope of protection to the limits of the examples.

Example 1

A cup-shaped or plate-like zinc electrode of a cell working with an electrolyte containing ammonimum chloride and with a depolarizing mix of the manganese dioxide type had a film of a thickness of 0.005 millimetre made of methyl-silicone resin applied thereto. The resin had been burned in at a temperature of 120 degrees centigrade during two hours. The discharge characteristic of the cell shows during a standard periodic discharge a capacity increased by about 15% with respect to cells without silicone-coatings. It has been observed that the amount of the dissolved zinc accurately corresponds to the electro-chemical equivalent weight whereas with newly made cells without silicone-coatings an amount of zinc increased by 30% is dissolved while being discharged according to the standard of periodic discharge during 15 to 20 days. The dissolution of the silicone-coated zinc in inaction amounts to about 1/3 of the zinc with no silicone-coating and shelf life or storage capacity of the cell is increased at a like rate.

Example 2

The inactive side of a zinc plate of a cell of the layer-built carbon-manganese dioxide zinc types was coated with a paste consisting of graphite powder forming a suspension with an ethyl silicone resin and the paste was burned in in the form of a layer of the thickness of about 0.025 millimetre at a temperature of 180 degrees centigrade during 2 hours. The depolarizing mix rests on this graphitic layer. It is possible to apply thinner layers of the silicone-graphite mixture than the conventional mixtures of synthetic resins and graphite. Therefore, the resistance of the layer and the voltage drop therein is relatively smaller. Furthermore, its protective capacity against corrosion is greater than that of layers on synthetic resin basis whereby the shelf life of the cells is increased.

Example 3

The mangesium electrode of a cell of the carbon-manganese dioxide magnesium type was coated with a phenyl-methyl-silicone resin. The rate of solubility of the magnesium is, generally, much greater than that of zinc whereby the use of cells containing magnesium and having, otherwise, high qualities, is rendered limited. By the presence of a silicone layer the rate of solubility of the magnesium is reduced to 1/10 to 1/20 whereby the shelf life or storage capacity of cells containing magnesium is enabled to reach the level of durability of silicone-coated cells containing zinc. A plurality of advantages of cells with magesium electrodes such as small weight, even voltage-current-characteristics, is practically rendered effective only by applying a silicone-coating thereon.

Example 4

In the manufacture of cells with manganese dioxide depolarizers, an amount of manganese dioxide of powder was mixed with 1% by weight of silicone oil whereafter the grains of the powder are coated with a thin and almost monomolecular film of silicone oil. Thereupon the manganese dioxide powder was mixed with amounts of graphite and electrolyte and extruded so as to form the positive electrode. The grains of manganese dioxide of such porous electrodes were highly water-repellent and their adjoining surfaces formed fine gas-passages whereby the depolarization was accelerated. The intrinsic resistance of the positive electrode did not increase simultaneously since the graphite powder uncoated with silicone contacts intimately with the grains of manganese dioxide and the internal electrolyte whereby a relatively small resistance is obtained.

Example 5

A silicone-coated electrode of negative polarity had, above the silicone-coating, still another coating of a thickness of 0.020 millimeter which consisted of a highly dispersed metal oxide powder such as colloidal aluminum oxide or silicon oxide, embedded into a silicon resin or lacquer. The metal oxide powder was present in a maximum quantity which was still able to be mixed with the silicone lacquer. The heavily loaded silicone-coating was of the porous form and the electrolyte penetrated therethrough to the electrode provided with a primary coating. The silicone-coated surface of the highly dispersed metal oxide powder formed, however in view of its water-repellent nature, fine passages in the electrolyte whereby the displacement of the chemically uncombined oxygen film forming on the surface of the negative electrode towards the depolarizer was accelerated and the depolarization increased. The voltage drop of dry cells having one of the aforesaid coatings was in operation relatively much smaller. Whereas the electrode of negative polarity was consumed in operation, the silicone-coating which warrants the existence of the gas-passages, was maintained on account of the above described operation.

Example 6

The working surface of the zinc electrode of a layer built pile was coated with a vinyl-silicone resin whereas a milk-paper-board resting on the zinc electrode and serving to absorb the electrolyte was impregnated with silicone oil. As in the previous examples, the gas-permeable passages for accelerating the depolarization were formed by the portions of the milk-paper board which have been rendered water-repellent.

Example 7

The positive porous carbon electrode of rod-shape of a cell working with air-depolarization was impregnated with a diluted silicone lacquer solution containing 1% silicone whereafter the solvent of the silicone lacquer was expelled by means of heating. Thereby gas-permeable passages were formed in the interior of the porous carbon rod between the carbon surface and the electrolyte so that the air depolarization was rendered relatively more effective.

*Example 8*

The spreading of cells with negative aluminum electrodes has practically been prevented by the quickly progressing corrosion of the aluminum at standstills or inactions of the cells. The dissolution of aluminums coated with silicone resin is lesser than that of an uncoated aluminum. A preferable embodiment comprised a cell with negative electrode formed by an aluminum plate coated with silicone resin, and an electrolyte consisting mainly of boric acid.

*Example 9*

In order to increase the service life of electro-chemical current sources destined for longer shelf life, several suggestions have been made according to which the storage capacity was increased by filling the source of current with the electrolyte or a portion thereof only immediately before the operation thereof. The negative electrode of a plurality of such cells consisted of magnesium, which had to be protected against corrosion even while stored in free air. Thus, the shelf life of such electro-chemical current sources, was likewise increased by applying a silicone-coating thereto.

*Example 10*

Cells with a depolarizer made of silver-peroxide, an electrolyte consisting of potassium hydroxide and a negative electrode made of zinc have great outputs. Their shelf life was increased when a coating of silicone was applied to the silver-peroxide depolarizer and/or the zinc electrode. A like effect was obtained by applying silicone-coatings to the electrodes of cells with a depolarizer of copper oxide.

*Example 11*

The shelf life of dry cells of the type having depolarizers made of lead peroxide and negative electrodes made of zinc were more efficiently increased by applying a silicone-coating to the aforesaid elements than with the previous examples since such dry cells have sulphuric acid for electrolyte so that the corrosion of zinc during the period of storage is material in the absence of coating.

*Example 12*

The corrosion preventing action of the silicon-coatings was likewise particularly significant in case of cells the negative electrodes of which consisted of sodium amalgam. Even the positive cupric oxide electrodes of such cells could be protected by means of silicone-coatings. The electrolyte consisted of sodium hydroxide.

*Example 13*

The shelf life of electro-chemical current sources with depolarizers made of mercury oxide and negative electrodes made of zinc amalgam is in their present form relatively long (1 to 2 years). Coating the negative electrode of such cells with silicone entailed an increase of shelf life to more than 10 years.

*Example 14*

The grid plates supporting the active paste of lead storage batteries have been coated with silicone so as to delay the corrosion during its charging and discharging periods. As a result, the battery life in respect to the amount of charge and discharge has been multiplied.

*Example 15*

Silicone-coatings are suitable also for coating the electrodes of storage batteries of the system iron-nickel, cadmium-nickel, silver-zinc and the like whereby the self-discharge is reduced and the battery-life in respect to the amount of charge and discharge increased.

What I claim is:

1. In an electro-chemical source of current of long shelf life having an electrolyte and at least one element having a surface in contact with and susceptible to deterioration by the electrolyte, the improvement wherein the element has the surface in contact with the electrolyte coated with a resin of a silicone polymer.

2. In an electro-chemical source of current as claimed in claim 1 in which the source is formed as a primary cell.

3. In an electro-chemical source of current as claimed in claim 1 in which the source is formed as a storage battery.

4. In an electro-chemical source of current of long shelf life, a soluble negative electrode coated with a resin of a silicone polymer, said negative electrode consisting at least mainly of a metal selected from the group consisting of lithium, sodium, potassium, magesium, calcium, barium, strontium, aluminum, lanthanum, zinc, cadmium, chromium, titanium, zirconium, iron, manganese, and an alloy containing at least one of the aforesaid metals.

5. In an electro-chemical source of current of long shelf life having an electrolyte and a depolarizer susceptible to deterioration by the electrolyte, the improvement wherein the depolarizer has a resin of a silicone polymer applied thereto.

6. In an electrochemical source of current of long shelf life having an electrolyte and an electrode and an active paste susceptible to deterioration by the electrolyte, the improvement wherein the electrode and active paste have a resin of a silicone polymer applied thereto.

7. In an electrochemical source of current of long shelf life, a negative electrode coated with a resin of a silicone polymer having a highly dispersed metal oxide powder embedded thereinto.

8. In an electrochemical source of current of the layer-built type of long shelf life, an electrode the inactive side of which is coated with a paste consisting of conductive particles embedded into a resin of a silicone polymer.

9. A manufacturing process for making electro-chemical sources of current of long shelf life of the type having an electrolyte, and electrodes, one of said electrodes being coated with a resin of a silicone polymer for reducing the rate of solubility of the aforesaid element, wherein the solubility rate-reducing action of the resin is selected so as to be greater than required and a relatively more aggressive electrolyte is used so that the intrinsic voltage drop is decreased.

10. In an electrochemical source of current of long shelf life having electrodes and an electrolyte, the improvement wherein a fibrous layer is disposed intermediate the electrodes, said layer being adapted to absorb the electrolyte and impregnated with a resin of a silicone polymer.

11. In an electrochemical source of current according to claim 1 having electrodes, the further improvement wherein a fibrous layer is disposed intermediate the electrodes, said layer being adapted to absorb the electrolyte and impregnated with a silicone polymer.

12. In an electrochemical source of current according to claim 4 having a positive electrode, the further improvement wherein a fibrous layer is disposed intermediate the positive and negative electrodes, said layer being adapted to absorb the electrolyte and impregnated with a silicone polymer.

References Cited in the file of this patent

UNITED STATES PATENTS 1,433,602    Cellino _____ Oct. 31, 1922

(Other references on following page)

UNITED STATES PATENTS

| | | |
|---|---|---|
| 1,497,160 | Pouchain | June 10, 1924 |
| 2,207,734 | Heise et al. | July 16, 1940 |
| 2,231,319 | Burgess | Feb. 11, 1941 |
| 2,546,379 | Woodring et al. | Mar. 27, 1951 |
| 2,697,737 | Goldberg et al. | Dec. 21, 1954 |
| 2,816,152 | Marsal | Dec. 10, 1957 |

FOREIGN PATENTS

| | | |
|---|---|---|
| 532,581 | Great Britain | Jan. 27, 1941 |

OTHER REFERENCES

McGregor, R. R.: "Silicones and Their Uses," McGraw-Hill Book Co., New York (1954), pp. vii and 105.